US011170181B2

(12) United States Patent
Beller et al.

(10) Patent No.: US 11,170,181 B2
(45) Date of Patent: *Nov. 9, 2021

(54) DOCUMENT PREPARATION WITH ARGUMENTATION SUPPORT FROM A DEEP QUESTION ANSWERING SYSTEM

(71) Applicant: INTERNATIONAL BUSINESS MACHINES CORPORATION, Armonk, NY (US)

(72) Inventors: Charles E. Beller, Baltimore, MD (US); William G. Dubyak, Boerne, TX (US); Palani Sakthi, Palatine, IL (US); Robert A. Sheets, Herndon, VA (US); Kristen M. Summers, Takoma Park, MD (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/454,421

(22) Filed: Jun. 27, 2019

(65) Prior Publication Data

US 2019/0318001 A1 Oct. 17, 2019

Related U.S. Application Data

(63) Continuation of application No. 15/827,016, filed on Nov. 30, 2017, now Pat. No. 10,387,576.

(51) Int. Cl.
*G06F 40/40* (2020.01)
*G09B 5/02* (2006.01)
(Continued)

(52) U.S. Cl.
CPC .......... *G06F 40/40* (2020.01); *G06F 40/247* (2020.01); *G06F 40/268* (2020.01);
(Continued)

(58) Field of Classification Search
CPC ............ G06F 16/3344; G06F 16/3329; G06F 40/247; G06F 40/268; G06F 40/289;
(Continued)

(56) References Cited

U.S. PATENT DOCUMENTS 4,253,248 A * 3/1981 Cornish ............... G09B 17/003
434/178
5,237,502 A * 8/1993 White ..................... G06F 40/56
704/1
(Continued)

FOREIGN PATENT DOCUMENTS

WO 9857284 A1 12/1998

OTHER PUBLICATIONS

Specification of U.S. Appl. No. 62/531,147, filed Jul. 11, 2017 (Year: 2017).*

(Continued)

*Primary Examiner* — Eric Yen
(74) *Attorney, Agent, or Firm* — Teddi E. Maranzano

(57) ABSTRACT

Dynamic semantic processing of text in a word processing application with engagement of question-answering system. A user provides a text stream to a computer system via an input source. The input text stream includes a first natural language statement. The system determines that the first natural language statement includes a fact-based component expressed in natural language form. The system identifies an initial span and an alternative span of the first natural language component, based on the determining. The system engages a question-answering (QA) system by providing the initial span and the alternative span of the first natural language component to the QA system, and by receiving, in response to the providing, a set of natural language results from the QA system. The system evaluates the initial span
(Continued)

and the alternative span of the first natural language component based on the received natural language results.

18 Claims, 7 Drawing Sheets

(51) Int. Cl.
*G09B 19/00* (2006.01)
*G09B 7/02* (2006.01)
*G06F 40/30* (2020.01)
*G06F 40/247* (2020.01)
*G06F 40/268* (2020.01)
*G06F 40/284* (2020.01)
*G06F 40/289* (2020.01)
*G06F 40/51* (2020.01)
*G06F 40/35* (2020.01)

(52) U.S. Cl.
CPC .......... *G06F 40/284* (2020.01); *G06F 40/289* (2020.01); *G06F 40/30* (2020.01); *G06F 40/51* (2020.01); *G09B 5/02* (2013.01); *G09B 7/02* (2013.01); *G09B 19/00* (2013.01); *G06F 40/35* (2020.01)

(58) Field of Classification Search
CPC .......... G06F 40/30; G06F 40/40; G06F 40/51; G06F 40/55; G06F 40/284; G06F 40/35; G09B 5/02; G09B 7/02; G09B 19/00
See application file for complete search history.

(56) References Cited

U.S. PATENT DOCUMENTS

| | | | |
|---|---|---|---|
| 5,386,556 A * | 1/1995 | Hedin | G06F 40/58 |
| 5,924,105 A | 7/1999 | Punch, III | |
| 6,269,362 B1 * | 7/2001 | Broder | G06F 16/951 |
| 6,609,087 B1 * | 8/2003 | Miller | G06F 40/211 |
| | | | 703/22 |
| 7,013,308 B1 * | 3/2006 | Tunstall-Pedoe | G06F 16/3329 |
| | | | 707/709 |
| 7,058,564 B2 | 6/2006 | Ejerhed | |
| 7,092,928 B1 * | 8/2006 | Elad | G06N 5/04 |
| | | | 706/60 |
| 7,107,204 B1 | 9/2006 | Liu | |
| 7,509,313 B2 | 3/2009 | Colledge | |
| 7,937,396 B1 * | 5/2011 | Pasca | G06F 40/247 |
| | | | 707/750 |
| 8,171,020 B1 * | 5/2012 | Kacholia | G06F 16/78 |
| | | | 707/722 |
| 8,543,565 B2 | 9/2013 | Feng | |
| 9,015,098 B1 * | 4/2015 | Crosley | G06N 5/048 |
| | | | 706/46 |
| 9,031,970 B1 * | 5/2015 | Das | G06F 40/274 |
| | | | 707/767 |
| 9,069,825 B1 * | 6/2015 | Chang | G06F 16/9535 |
| 9,275,021 B2 | 3/2016 | Bhatt | |
| 9,330,084 B1 * | 5/2016 | Kadambi | G06F 40/56 |
| 9,432,829 B1 * | 8/2016 | Holthausen | H04W 4/12 |
| 9,514,113 B1 * | 12/2016 | Shaw | G06F 40/169 |
| 9,569,538 B1 * | 2/2017 | Clark | G06F 16/3344 |
| 9,659,056 B1 * | 5/2017 | Chechik | G06F 16/2462 |
| 9,720,981 B1 * | 8/2017 | Boguraev | G06F 16/683 |
| 2003/0115039 A1 | 6/2003 | Wang | |
| 2004/0078359 A1 * | 4/2004 | Bolognese | G06F 16/2452 |
| 2004/0117352 A1 * | 6/2004 | Schabes | G06F 16/3344 |
| 2004/0261021 A1 | 12/2004 | Mittal | |
| 2005/0080775 A1 * | 4/2005 | Colledge | G06Q 30/0251 |
| 2005/0080780 A1 | 4/2005 | Colledge | |
| 2005/0086045 A1 | 4/2005 | Murata | |
| 2005/0256700 A1 * | 11/2005 | Moldovan | G06F 40/30 |
| | | | 704/9 |
| 2006/0059132 A1 * | 3/2006 | Zhang | G06F 16/9577 |
| 2006/0149720 A1 * | 7/2006 | Dehlinger | G06F 16/313 |
| 2006/0282457 A1 * | 12/2006 | Williams | G06F 16/1752 |
| 2007/0022108 A1 * | 1/2007 | Nakadai | G06F 16/24564 |
| 2007/0038609 A1 * | 2/2007 | Wu | G06F 16/334 |
| 2007/0043708 A1 * | 2/2007 | Tunstall-Pedoe | G06F 16/3329 |
| 2007/0118794 A1 | 5/2007 | Hollander | |
| 2007/0164782 A1 * | 7/2007 | Church | G06F 40/274 |
| | | | 704/9 |
| 2007/0299651 A1 * | 12/2007 | Koll | G10L 15/02 |
| | | | 704/9 |
| 2008/0040339 A1 * | 2/2008 | Zhou | G06F 16/3334 |
| 2008/0140387 A1 * | 6/2008 | Linker | G06F 40/40 |
| | | | 704/9 |
| 2008/0147619 A1 * | 6/2008 | O'Malley | G06Q 30/02 |
| 2008/0154848 A1 * | 6/2008 | Haslam | G06F 16/382 |
| 2008/0221869 A1 | 9/2008 | Johnson | |
| 2008/0270116 A1 * | 10/2008 | Godbole | G06F 40/35 |
| | | | 704/9 |
| 2009/0037382 A1 * | 2/2009 | Ansari | G06F 16/68 |
| 2009/0083243 A1 * | 3/2009 | Heymans | G06F 16/2452 |
| 2009/0089047 A1 * | 4/2009 | Pell | G06F 40/30 |
| | | | 704/9 |
| 2009/0119090 A1 * | 5/2009 | Niu | G06F 40/44 |
| | | | 704/1 |
| 2009/0265304 A1 * | 10/2009 | Ait-Mokhtar | G06F 16/30 |
| 2009/0300482 A1 * | 12/2009 | Summers | G06F 16/832 |
| | | | 715/234 |
| 2010/0010803 A1 * | 1/2010 | Ishikawa | G06F 40/247 |
| | | | 704/9 |
| 2010/0082649 A1 * | 4/2010 | Gutt | G06F 16/951 |
| | | | 707/758 |
| 2010/0138216 A1 * | 6/2010 | Tanev | G06F 40/279 |
| | | | 704/9 |
| 2010/0191717 A1 * | 7/2010 | Graefe | G06F 16/24578 |
| | | | 707/713 |
| 2010/0205167 A1 * | 8/2010 | Tunstall-Pedoe | G06F 16/24 |
| | | | 707/706 |
| 2010/0257182 A1 * | 10/2010 | Saliba | G06F 40/253 |
| | | | 707/747 |
| 2010/0299314 A1 * | 11/2010 | Sengupta | G06Q 10/06311 |
| | | | 707/687 |
| 2011/0066587 A1 | 3/2011 | Ferrucci | |
| 2011/0161801 A1 | 6/2011 | Harrop | |
| 2011/0295589 A1 * | 12/2011 | Brockett | G06F 40/289 |
| | | | 704/4 |
| 2011/0301935 A1 * | 12/2011 | Quirk | G06F 40/295 |
| | | | 704/2 |
| 2012/0078636 A1 * | 3/2012 | Ferrucci | G06F 16/24564 |
| | | | 704/270.1 |
| 2012/0084293 A1 | 4/2012 | Brown | |
| 2012/0131016 A1 * | 5/2012 | Brown | G06F 16/338 |
| | | | 707/748 |
| 2012/0330919 A1 * | 12/2012 | Chen | G06F 16/3322 |
| | | | 707/706 |
| 2013/0019286 A1 * | 1/2013 | Barborak | G06F 21/31 |
| | | | 726/4 |
| 2013/0071821 A1 * | 3/2013 | Drmanac | G09B 19/00 |
| | | | 434/236 |
| 2013/0103390 A1 | 4/2013 | Fujita | |
| 2013/0151240 A1 * | 6/2013 | Myslinski | G06Q 10/10 |
| | | | 704/9 |
| 2013/0173256 A1 * | 7/2013 | Eggebraaten | G06F 40/40 |
| | | | 704/9 |
| 2013/0268519 A1 * | 10/2013 | Cucerzan | G06F 16/951 |
| | | | 707/723 |
| 2014/0006012 A1 * | 1/2014 | Zhou | G06F 16/3344 |
| | | | 704/9 |
| 2014/0040301 A1 * | 2/2014 | Chadha | G06F 40/30 |
| | | | 707/765 |
| 2014/0298199 A1 * | 10/2014 | Johnson, Jr. | H04L 65/403 |
| | | | 715/753 |
| 2014/0380285 A1 | 12/2014 | Gabel | |
| 2015/0074112 A1 | 3/2015 | Liu | |
| 2015/0081276 A1 * | 3/2015 | Gerard | G06F 40/242 |
| | | | 704/9 |
| 2015/0082161 A1 | 3/2015 | Byron | |

(56) References Cited

U.S. PATENT DOCUMENTS

| | | | |
|---|---|---|---|
| 2015/0154308 A1* | 6/2015 | Hagg | G06F 16/954 707/722 |
| 2015/0248482 A1* | 9/2015 | Myslinski | G06F 16/3344 707/706 |
| 2015/0248736 A1* | 9/2015 | Myslinski | G06F 3/0488 705/319 |
| 2015/0261859 A1* | 9/2015 | Isensee | G06F 3/04842 707/723 |
| 2015/0309990 A1* | 10/2015 | Allen | G06F 16/245 704/9 |
| 2015/0339574 A1* | 11/2015 | Allen | G06F 16/2365 706/11 |
| 2016/0004766 A1* | 1/2016 | Danielyan | G06F 40/20 707/723 |
| 2016/0019293 A1* | 1/2016 | Bhagwat | G06F 16/248 707/732 |
| 2016/0063993 A1 | 3/2016 | Dolan | |
| 2016/0078086 A1* | 3/2016 | Nowak-Przygodzki | G06F 16/24534 707/723 |
| 2016/0085744 A1* | 3/2016 | Dunn | G06F 40/30 705/39 |
| 2016/0098448 A1 | 4/2016 | McShane | |
| 2016/0124928 A1 | 5/2016 | Fink | |
| 2016/0132590 A1* | 5/2016 | Byron | G06F 16/3329 707/734 |
| 2016/0140439 A1* | 5/2016 | Adderly | G06F 16/367 706/46 |
| 2016/0140445 A1* | 5/2016 | Adderly | G06F 16/367 706/52 |
| 2016/0140958 A1* | 5/2016 | Heo | G06F 40/30 704/9 |
| 2016/0179934 A1* | 6/2016 | Stubley | G06N 5/00 707/722 |
| 2016/0293034 A1* | 10/2016 | Agarwalla | G06F 16/90332 |
| 2016/0306791 A1* | 10/2016 | Allen | G06F 16/3329 |
| 2016/0350279 A1* | 12/2016 | Byron | G06F 40/205 |
| 2016/0350406 A1* | 12/2016 | Byron | G06F 16/3344 |
| 2017/0103439 A1* | 4/2017 | Kolb | G06F 16/93 |
| 2017/0116555 A1* | 4/2017 | Griffin | G06Q 10/1091 |
| 2017/0142043 A1* | 5/2017 | Narayanswamy | H04L 51/12 |
| 2017/0235895 A1* | 8/2017 | Cox | G06F 16/3344 705/2 |
| 2017/0293620 A1* | 10/2017 | Boguraev | G06F 16/353 |
| 2017/0293677 A1* | 10/2017 | Boguraev | G06F 16/243 |
| 2018/0196881 A1* | 7/2018 | Lundin | G06F 40/205 |
| 2018/0307676 A1* | 10/2018 | Ben Shahar | G06F 40/30 |
| 2019/0006027 A1* | 1/2019 | Sacaleanu | G16H 50/30 |
| 2019/0066379 A1* | 2/2019 | Dickenson | H04L 67/38 |
| 2019/0155900 A1* | 5/2019 | Ghotbi | G06N 20/00 |
| 2019/0163745 A1 | 5/2019 | Beller et al. | |
| 2019/0332664 A1* | 10/2019 | O'Neill | G06F 40/106 |
| 2020/0160199 A1* | 5/2020 | Al Hasan | G06F 16/90332 |

OTHER PUBLICATIONS

Dhariwal, D., "Text and ontology driven clinical decision support system", 2013, Available from ProQuest Dissertations and Theses Professional. Retrieved from https://dialog.proquest.com/professional/docview/1399993886?accountid=131444 (Year: 2013).*

Bernstein et al., "Soylent: A Word Processor with a Crowd Inside," UIST '10, Proceedings of the 23rd Annual ACM Symposium on User Interface Software and Technology, Copyright ACM 2010 (Best date available), pp. 1-11.

Bolinger, "Yes-No Questions Are Not Alternative Questions", Copyright 1978 (Best Date Available) by D. Reidel Publishing Company, Dordrecht, Holland, 11 pages.

Chesnevar et al., "Argument-based critics and recommenders: A qualitative perspective on user support systems," Elsevier, ScienceDirect, Data & Knowledge Engineering 59, 2006, pp. 293-319, doi: 10.1016/j.datak.2005.09.005.

Gondek et al., "A Framework for Merging and Ranking of Answers in DeepQA", IBM J. Res. & Dev. vol. 56, No. 3/4 Paper 14, May/Jul. 2012, 11 pages.

Green et al., "Generating Indirect Answers to Yes-No Questions", 7th International Generation Workshop, Kennebunkport, ME, Jun. 21-24, 1994, pp. 189-198.

Hirschberg, "Toward a Redefinition of Yes/No Questions", ACL 1984 Proceedings of the 10th International Conference on Computational Linguistics and 22nd Meeting on Associationfor Computational Linguistics, pp. 48-51.

Hockey et al., "Can You Predict Responses to Yes/no Questions? Yes, No and Stuff," Fifth European Conference on Speech Communication and Technology, EUROSPEECH 1997 Rhodes, Greece, Sep. 22-25, 1997, pp. 1-4.

Hu et al., "Study on the Automatic Composition of Document Service Based on Semantic and Multi-agent Method," CCTA 2011, Part III, IFIP AICT 370, International Federation for Information Processing, 2012 (Best date available), pp. 308-314.

Kanayama et al., "Answering Yes/No Questions via Question Inversion", Proceedings of Coling 2012: Technical Papers, Coling, 2012, Mumbai, Dec. 2012, pp. 1377-1392.

Mayfield, "Evaluating Plan Recognition Systems: Three Properties of a Good Explanation", Artificial Intelligence Review 14: 2000 (Best Date Available), pp. 351-376.

Mell et al., "The NIST Definition of Cloud Computing," National Institute of Standards and Technology, U.S. Department of Commerce, Special Publication 800-145, Sep. 2011, pp. 1-7.

Mohtarami et al., "Predicting the Uncertainty of Sentiment Adjectives in Indirect Answers", CIKM'11, Oct. 24-28, 2011, Glasgow, Scotland, UK, pp. 1-4.

Murdock, "Textual Evidence Gathering and Analysis", IBM J. Res & Dev. vol. 56, No. 3/4, Paper 8, May/Jul. 2012, pp. 8:1-8:14.

Trojahn et al., Ontology Mapping for a Legal Question Answering System, http://hdl.handle.net/10174/1500, Appears in Collections: INF—Artigos em Livros de Actas/Proceedings, dc.date.issued: 2007 (Best date available), pp. 1-10.

Wang, "A Survey of Answer Extraction Techniques in Factoid Question Answering", 2006, Association for Computational Linguistics (Best Date Available), pp. 1-14.

IBM: List of IBM Patents or Patent Applications Treated As Related (Appendix P), Jun. 27, 2019, pp. 1-2.

* cited by examiner

500 receiving an input text stream from a user via an input source, the input text stream comprising a first natural language statement. 504

↓ evaluating the input text to determine that the input text comprises a fact-based component expressed in natural language form. 508

↓ identifying an initial span and an alternative span of the first natural language component. 512

↓ engaging a question-answering (QA) system by providing the initial span and the alternative span of the first natural language component to the QA system, and by receiving, in response to the providing, a set of natural language results from the QA system. 516

↓ evaluating the initial span and the alternative span of the first natural language component based on the received natural language results. 520

↓ identifying, based on the evaluating, a set of passages and keywords having associated scores corresponding to how well the set of passages and keywords support the initial span and the alternative span of the first natural language component. 524

FIG. 5

DOCUMENT PREPARATION WITH ARGUMENTATION SUPPORT FROM A DEEP QUESTION ANSWERING SYSTEM

The present invention was made with United States Government support. The government has certain rights in the invention.

BACKGROUND

Embodiments of the invention generally relate to electronic word processing applications, and in particular to natural language processing and graphical user interfaces of those applications.

Conventional word processing programs receive user input, typically via a keyboard, and display the input via a graphical user interface (GUI) component, such as a document window. The user input can include text. Text entry into a conventional word processing program is generally static. However, many such applications do include features such as spell-check, grammar check, and auto-correct, which process input text as the user enters it into the application. A few other text analysis features offered via a text processing application include word and character counts, readability level assessment, and thesaurus and dictionary lookup.

SUMMARY

Embodiments of the invention include a method, computer program product, and system, for processing user input in a word processing program. The word processing program receives an input text stream from a user via an input source. The input text stream includes a first natural language statement. The word processing program determines that the first natural language statement includes a fact-based component expressed in natural language form. The word processing program identifies an initial span and an alternative span of the first natural language component, based on the determining. The word processing program engages a question-answering (QA) system by providing the initial span and the alternative span of the first natural language component to the QA system, and by receiving, in response to the providing, a set of natural language results from the QA system. The word processing program evaluates the initial span and the alternative span of the first natural language component based on the received natural language results.

BRIEF DESCRIPTION OF THE SEVERAL VIEWS OF THE DRAWINGS

FIG. 5 is a flowchart of a method for providing word processing functions by the word processing program of FIG. 2, according to an embodiment of the invention.

DETAILED DESCRIPTION

Figure 1:
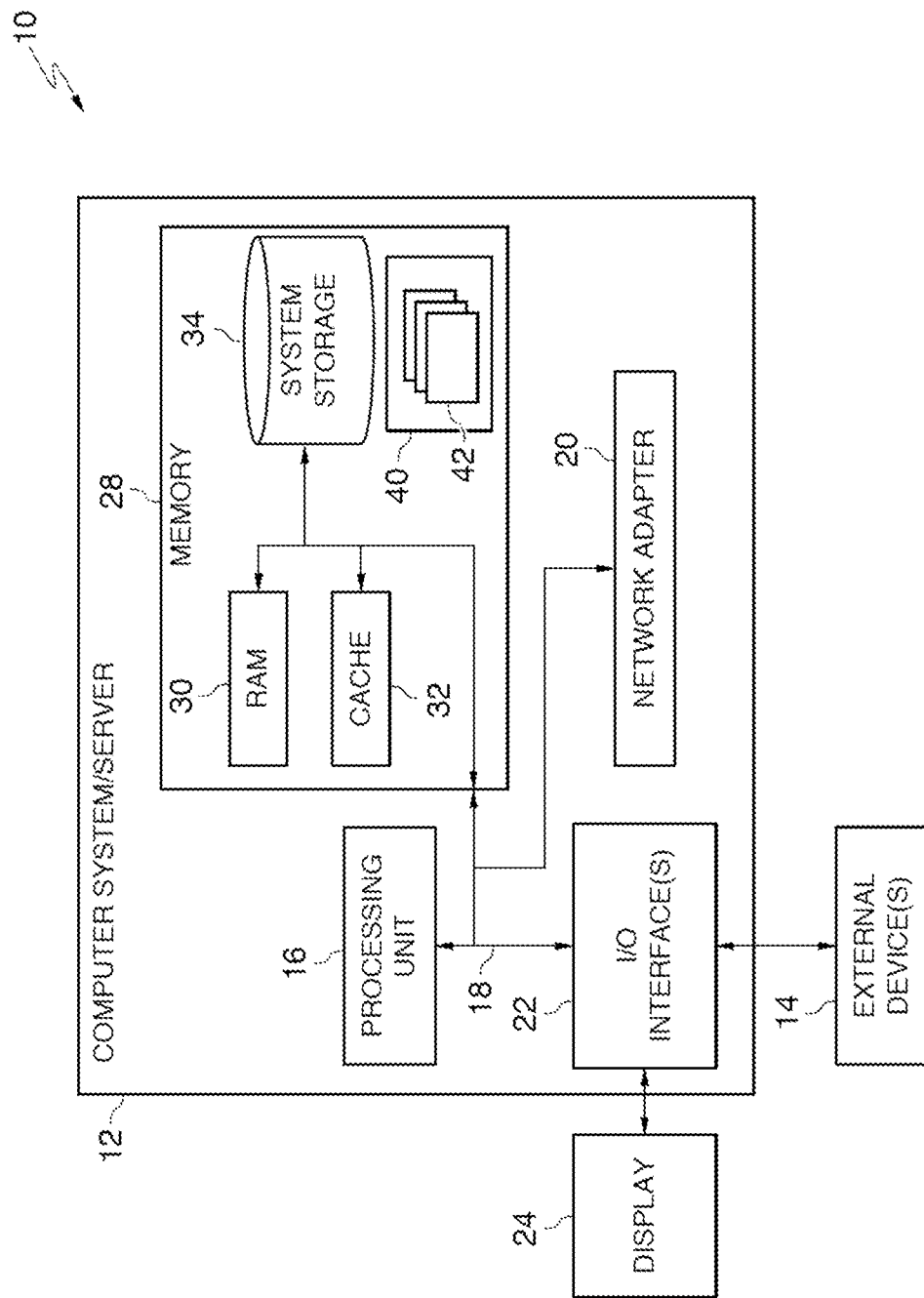
FIG. 1 is a block diagram of an illustrative computing node, according to an embodiment of the invention.

Conventional word processing programs provide only limited and static analysis of user input. The analysis applies static rules to elementary and surface properties of text (for example, whether a word is misspelled). The analysis does not consider or provide any useful function based on the text's semantic meaning. The application can indicate to the user that she has misspelled a word, or that she has used incorrect grammar; the application cannot give her feedback about how well evidence supports or refutes a given statement, semantically.

Some embodiments of the invention may provide dynamic semantic feedback to a user of a word processing application via a graphical user interface. Among this feedback may be visually presented information that indicates to the user that for a given statement the user has made in her writing, there are alternative formulations of that text that are more highly scored by a natural language processing system that evaluates statements (such as a question-answering system). For example, if the user writes the statement "vipers are not poisonous", embodiments of the invention may evaluate the statement and indicate to her (e.g., via underlining or highlighting" that an alternative formulation of that statement (e.g., its opposite) stating "vipers are poisonous" yields a higher confidence score than the original statement. The user can benefit from this technological solution because the user can, for example, click on the original statement, assess its veracity as against alternative statements, and select a better formulation of the statement. This process dramatically improves the task of generating text documents on a computer, and is therefore an improvement to the computer itself.

In fact, the challenge of substantive content evaluation in electronic word processing programs is a non-trivial technical matter. Meeting the challenge and designing a solution, as is done in embodiments of the present invention, requires technical solutions to data gathering, processing, and analysis, unique to how this data is received and processed in electronic systems. The manner in which these solutions are implemented is not known, conventional, or routine. Word processing systems as provided for by embodiments of the invention that perform substantive content evaluation behave differently than mental processes with which a human reviewer evaluates the same text. In other words, embodiments of the invention are not directed to determining whether a user's statement is true or false, right or wrong. Instead, embodiments of the invention are directed to methods and systems for evaluating the user input to electronically available information to assist the user in assessing the veracity of her statements in light of other electronically stored text. Therefore, the improvements that are enabled by embodiments of the invention are directed to improving electronic word processing systems and the user experience they provide; not the process of verifying the veracity of a statement. This and other features of the invention are made clear through discussion of various embodiments of the invention, in relation to the illustrative figures.

The following illustrates some of the reasons why evaluating the veracity of a statement by an electronic natural language system is a technical challenge. Some such systems such as search engines or question-answering systems evaluate search strings, or questions and responses, but how well these systems work very much depends on the formulation of the search string or the question, and the nature of the evidence as it exists in reference data corpora. In other words, the technical nature of how the search strings or questions are posed, the technical nature in which they are stored, and the technical nature in which each of them is analyzed, is a concrete innovation in computing technology in the area of electronic natural language processing.

For example, in response to receiving the search phrase "first president of the United States," a traditional search engine may rank the following results closely to one another: "George Washington was the first president of the United States," and "George Washington was not the first president of the United States." While the two search results are substantially similar (they share ten words appearing in the same sequence with the exception of "not" in the second sentence), they convey completely opposite meanings. The search engine likely presents both sentences as highly relevant in its search results, even though at least one of the two sentences is completely wrong.

As a further example, in response to receiving the question "is making molten glass a chemical change?", a conventional question-answering system may not find a reliable answer simply because of how the question is asked and how the evidence used to find the answer is worded; if asked a different way (e.g., "is making molten glass a physical change?"), the evidence may provide a very reliable answer. In this case, all that has changed is the formulation of the question. The reason is that these systems look for evidence passages to evaluate the question. Depending on how the passages are worded, they may provide good support or no support for a candidate answer to the question under consideration. For example, it may be expected that the scientific literature on the topic of "melting glass" likely describes the process as a physical change. Since the process is not a chemical change, the literature is less likely to mention the phrases "melting glass" and "chemical process" together. Therefore, if the question is phrased as "is melting glass a chemical change", then a scoring algorithm that is designed to assign a higher score to an evidence passage containing co-occurrence of the two phrases "melting glass" and "chemical change" will undoubtedly fail to assign a high score to a very reliable passage where "melting glass" and "physical change" co-occur.

Accordingly, when engaging with question-answering systems (and other natural language systems), it is often desirable to change the span of a given natural language statement so that the system is not hampered by the particular way the question or its corpus of data is formulated.

One class of natural language statements are statements having a fact-based component, expressed in natural language form. Generally, a fact-based component of a natural language statement is itself a statement that can be categorized as true or false, or can be restated as a question having a yes or no answer. In an embodiment, the determination of whether a statement is or contains a fact-based component may be done using a rule-based or trained classifier. Illustrative and non-limiting examples of such rules include: if content contains "Section $NUM", assign label "non-verifiable" (this rule classifies as "non-verifiable" text components that are arbitrary and would be unlikely to have evidence that can support or refute them); if content contains deictic pronouns (e.g. "this paper"), assign label "non-verifiable" (this rule classifies as "non-verifiable" text components that express information privileged to the author of the text and thus not likely to be available for verification using an external source such as a data corpus); if content contains first or second person pronouns (I/me/my/mine, you/your/yours), assign label "non-verifiable" (this rule classifies as "non-verifiable" statements that appear to be subjective); if content is determined to be opinion-based, assign label "non-verifiable" (this rule classifies as "non-verifiable" statements that are believed to be opinion-based and subjective, and therefore may be, in some circumstances, unlikely to have corroborating or refuting evidence).

Another way to classify a text component as a fact-based component is to consider whether the component naturally can be described as a polar statement. A polar statement may be one that can be stated as a polar question. A polar question is one that can be answered with a yes or a no answer. An example of a polar statement is "vipers are poisonous". An example of a corresponding polar question is "are vipers poisonous?". One approach in which a natural language processing system can evaluate the evidence available to support or refute a polar statement is to generate a corresponding polar question and provide the polar question to a question-answering system for further processing. In another approach, the polar statement may be processed without conversion to a question.

In either case, the polar statement or polar question may have an initial span. The initial span refers to the original formulation of the statement/question, or its modified form (e.g., normalization; modification in this context doesn't change the polarity of the statement/question). The polar statement or polar question may also have one or more alternate spans which change the polarity of the statement/question.

Changing the polarity of a statement reverses the true/false characteristic of the statement. Changing the polarity of a question reverses the yes/no answer to the question. One way in which the polarity of a statement or question may flipped is by identifying a pivot word (a term which, if replaced with a polar lexical substitute, will flip the statement's or question's polarity) and replacing it with another word, such as an antonym (opposite) or a "sibling word" (e.g., in the sentence "dogs are the most popular household pets in the United States", "dogs" can be replaced with a sibling word "cat" to generate a new statement). For example, snakes can be poisonous or non-poisonous; an activity can be legal or illegal; substances can be in a solid, liquid or gas state; an establishment can be in business or out-of-business.

Submitting a statement or question to a question-answering system in the form of its initial span and in the form of its alternate span yield different evidence and different scores. Again, in the case of the statement "melting glass is a chemical change" (which is false) or "is melting glass a chemical change?" (the answer to which is no), a traditional question-answering system may fail to identify the statement as false or answer no to the question if the analyzed corpus does not contain enough evidence passages that describe "melting glass" in relation to a "chemical" change. This may be the case in many instances where the evidence passages discuss "melting glass" by describing what it is, rather than by what it is not. Processing of this statement or question is likely to get no answer or an answer with a very low confidence score. One the other hand, processing the flipped versions of the same statement or question, i.e., their alternative spans, is likely to get a high confidence score. In this example, the word "chemical" may be identified as a pivot word and flipped to "physical" to create the alternative spans "melting glass is a physical change" or "is melting glass a physical change?".

Initial spans and alternative spans may be evaluated according to any known approach in the art of electronic natural language processing and textual polarity. Some such approaches are disclosed in U.S. patent application Ser. Nos. 15/091,775, 15/091,781, and 15/091,790, all three titled "Natural Language Processing Based On Textual Polarity", and all three filed on Apr. 6, 2016. The three applications are incorporated herein by reference in their entirety.

For example, a method for processing a natural language question in a computing system identifies an electronic text as a polar question having a polarity value. The method selects at least one pivot word in the polar question for replacement with a lexical substitute word. Replacing the at least one pivot word in the polar question with the lexical substitute word flips the polarity value of the polar question. The method generates a flipped polar question by replacing the selected pivot word with the corresponding lexical substitute word.

According to an embodiment, the method identifies the electronic text as a polar question by detecting a polar word in the electronic text based on the polar word matching at least one criterion for a polar term, and identifies the electronic text as a polar question based on the detecting.

According to a further embodiment, the method selects at least one pivot word in the polar question for replacement with a lexical substitute by generating a predicate-argument structure (PAS) for the polar question, comparing a pattern in the PAS to one or more patterns in a set of pattern matching rules (the set of pattern matching rules include predetermined PAS patterns), and selecting the at least one pivot word based on the comparison resulting in a match between the pattern in the PAS to at least one of the one or more patterns in the set of pattern matching rules.

According to a further embodiment, the method generates an additional flipped polar question by replacing the selected pivot word with another lexical substitute word.

According to a further embodiment, the method selects at least one additional pivot word in the polar question for replacement with a corresponding lexical substitute word, and generates an additional flipped polar question by replacing the additional pivot word with the corresponding lexical substitute word.

According to a further embodiment, the method queries a text corpus using at least one term in the flipped polar question, receive an evidence passage in response to the query, and associate the received evidence passage with the flipped polar question.

According to a further embodiment, the method provides the flipped polar question and the evidence passage to a processing stage in a natural language processing pipeline.

According to a further embodiment, the method assigns a score to the evidence passage based on the passage meeting a set of query criteria. Assigning a score may include processing the evidence passage using a scorer in a natural language processing pipeline.

According to a further embodiment, the method selects an additional pivot word in the polar question, substitutes the additional pivot word with the lexical substitute word to generate an additional flipped polar question, receives an additional candidate answer in response to querying a text corpus (query terms used in the querying are selected based at least on the additional flipped polar question), queries a text corpus using at least one term in the additional flipped polar question, receives an additional candidate answer in response to the query, generates an additional hypothesis including a pairing of the additional flipped question and the additional candidate answer, and assigns a score to the additional evidence passage.

According to a further embodiment, the method generates an answer based on comparing the assigned score of the evidence passage to the assigned score of the additional evidence passage.

According to a further embodiment, the method generates an answer by processing a set of pairs of a question and an answer using a merging and ranking stage of a natural language processing pipeline. The set of pairs include at least one of the polar question and the additional polar question.

According to an aspect of the invention, at least one definition associated with the pivot word is defined to be an opposite of at least one definition associated with the lexical substitute word. In a related embodiment, the polarity value corresponds to at least one of a yes or no answer.

According to a further embodiment, the method selects the at least one pivot word in the polar question for replacement with a corresponding lexical substitute word by receiving a ranked set of one or more candidate pivot words based on a machine learning model. The ranked set include n candidate pivot words. The method generates a set of flipped polar questions by replacing at least one candidate pivot word with a lexical substitute word.

According to a further embodiment, the method generates an answer to the polar question. Generating an answer to the polar question can include scoring at least the polar question and at least one flipped polar question to generate a set of score vectors, merging the score vectors, analyzing the merged score vectors to a model generated by a machine learning (ML) engine, and generating the answer based on the analyzing.

Referring now generally to the Figures, the subject matter of FIGS. 1-5 is initially described, one by one. For example, the various computing environments and the devices and programs, i.e., components, that operate in them, are described in some detail with reference to FIGS. 1-4, individually. Thereafter, these components are described more dynamically in reference to FIGS. 1-4 and FIG. 5; the latter provides at least one method by which the components of FIGS. 1-4 can operate, according to embodiments of the invention. Finally, some cloud computing embodiments are described in connection with FIGS. 6 and 7.

Referring now to FIG. 1, a schematic of an exemplary computing device (which may be a cloud computing node) is shown, according to an embodiment of the invention. Computing device 10 is only one example of a suitable cloud computing node and is not intended to suggest any limitation as to the scope of use or functionality of embodiments of the invention described herein.

In computing device 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in computing device 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
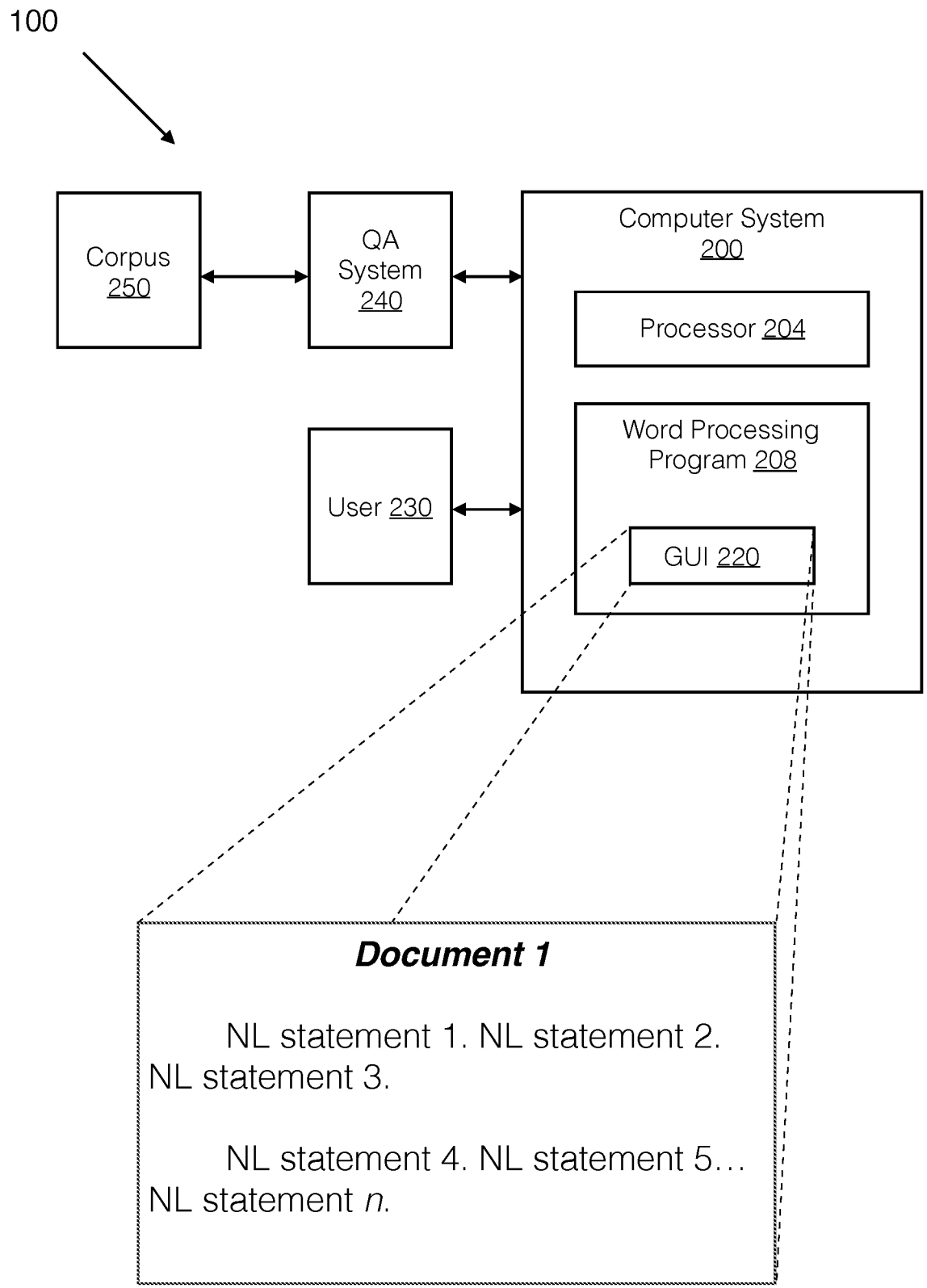
FIG. 2 is a block diagram of an exemplary computing environment for providing a word processing program to a user, according to an embodiment of the invention.

Referring now to FIG. 2, a block diagram of an exemplary computing environment for providing a word processing program to a user is illustrated, according to an embodiment of the invention. Computing environment 100 may include a computing system 200, a user 230, a question answering (QA) system 240, and a corpus 250 of documents (there may be more than one such corpus).

Computing system 200 may be, for example, a computing device 10 (and/or computer/server 12) as described in connection with FIG. 1. Computing system 200 may include a processor 204 and a word processing program 208. The word processing program may include a graphical user interface (GUI) 220. Word processing program 208 may include a set of programming instructions executable by processor 204 to perform one or more functions or methods (such as method 500 as described in connection with FIG. 5), including interacting with user 230 through GUI 220. Word processing program may take many forms, including a pure text processing program, a presentation program (e.g., for creating presentation slides), an instant messaging application, or any other application that receives or generates text data.

GUI 220 may display one or more electronic documents having natural language text. The natural language text may include an input text stream that may be received from user 230, or from another source. For example, user 230 may enter the input text stream into the electronic document. The input text stream may also be loaded into the electronic document from local or remote memory (e.g., from an external server, the internet, etc.). The input text stream may also be provided from a combination of these sources. The input text stream may include characters, words, sentences, paragraphs, or other groupings of text.

User 230 may be a human user, an automated process, or a remote system interacting with computer system 200 via an input/output (I/O) component. In one example, user 230 may be a human user interacting with word processing program 208 by entering text into the program's GUI 220 via a keyboard and mouse or other input/output devices.

With continued reference to FIG. 1, QA system 240 may be a computing system as more specifically described in connection with FIG. 4. Generally, QA system 240 is a computing system that receives text input, which may be in the form of a natural language question, and in response provides one or more answers in natural language form. The one or more answers may have associated scores (the score may be referred to as a confidence score) to and associated evidence. The associated scores and evidence are determined using various scorers of QA system 240 and the electronic documents stored in corpus 250. Corpus 250 stores natural language text that may be organized, for example, as documents, keywords, passages, or other groupings of text. Generally, a score associated with an answer returned by the QA system represents a measured confidence that the answer is a correct one. The term "measured confidence" refers to how well a given set of evidence (in corpus 250) supports the choice of the returned answer. QA system 240 may return multiple answers, each associated with its own score. Additional details of QA system 240 are described in connection with FIG. 4.

Figure 3:
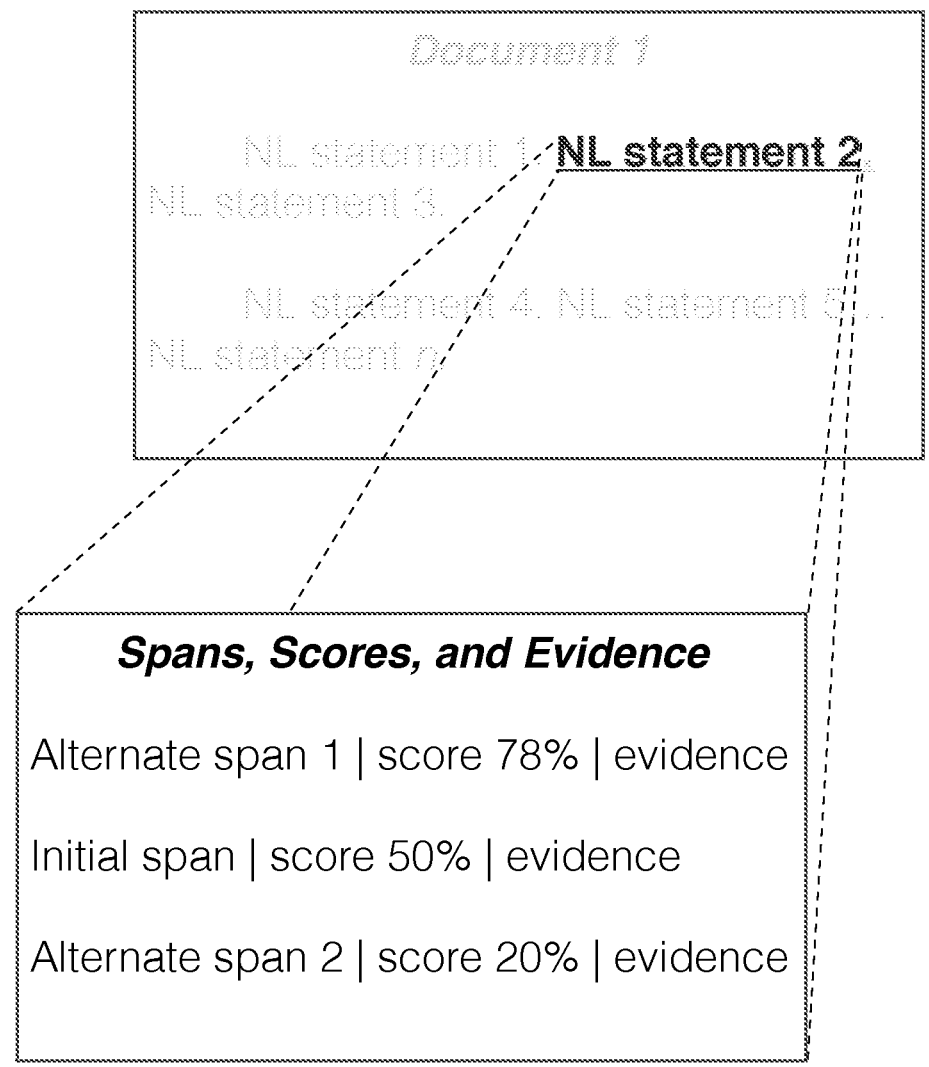
FIG. 3 is a block diagram of illustrative graphical user interface (GUI) components of the word processing program of FIG. 2, according to an embodiment of the invention.

Referring now to FIG. 3, a block diagram is provided which illustrates additional GUI 220 components of word processing program 208 of FIG. 2, according to an embodiment of the invention. Whereas FIG. 2 illustrates a typical word processing program window that displays a natural language document, Document 1, FIG. 3 illustrates additional GUI functions as provided by various embodiments of the invention, such as execution of method 500 (FIG. 5). For instance, an output of QA system 240 may be used to enrich the text data in Document 1 provides, for a given natural language statement (e.g., NL statements 1-n). The specific processes by which the various natural language texts are enriched is described in greater detail in reference to FIG. 5 and the other figures. Generally, however, it can be observed that in one embodiment, a given enriched natural language statement, such as NL statement 2, may be displayed more prominently (e.g., via highlighting, underlining, bolding, or other indicator) than other text in Document 1. The more prominent display of NL statement 2 via GUI 220 indicates to the user that insights may be available regarding the veracity of the natural language statement. In another embodiment, several or even all natural language statements may be enriched and provided to user 230 via GUI 220. In one embodiment, user 230 may hover a mouse pointer over or click on an enriched natural language statement. In response to such user input, GUI 220 may display a popup panel (or display it in a side pane, or present the information in any other known method in the art). The popup panel may display one or more text spans. A text span refers to a formulation of the natural language statement under consideration. The original formulation is referred to the initial span. The initial span may also refer to a smaller portion of the natural language statement under consideration.

An alternate span of the natural language text under consideration (e.g., NL statement 2 may have corresponding alternate spans 1-n) generally may be a variation of the natural language text. In one embodiment, the alternate span may be a negated form of the initial span. In another embodiment, the alternate span may be similar to the initial span with one or more terms replaced.

Generally, as will be described later in connection with FIG. 5, the initial span and the alternate span can be submitted to QA system 240 to obtain evidence passages and confidence scores. As shown in FIG. 3, the evaluated spans, their scores, and corresponding evidence passages can be provided to user 230 via GUI 220. This technological solution allows user 230 to easily consider modifying the various natural language statements in the document under consideration.

Figure 4:
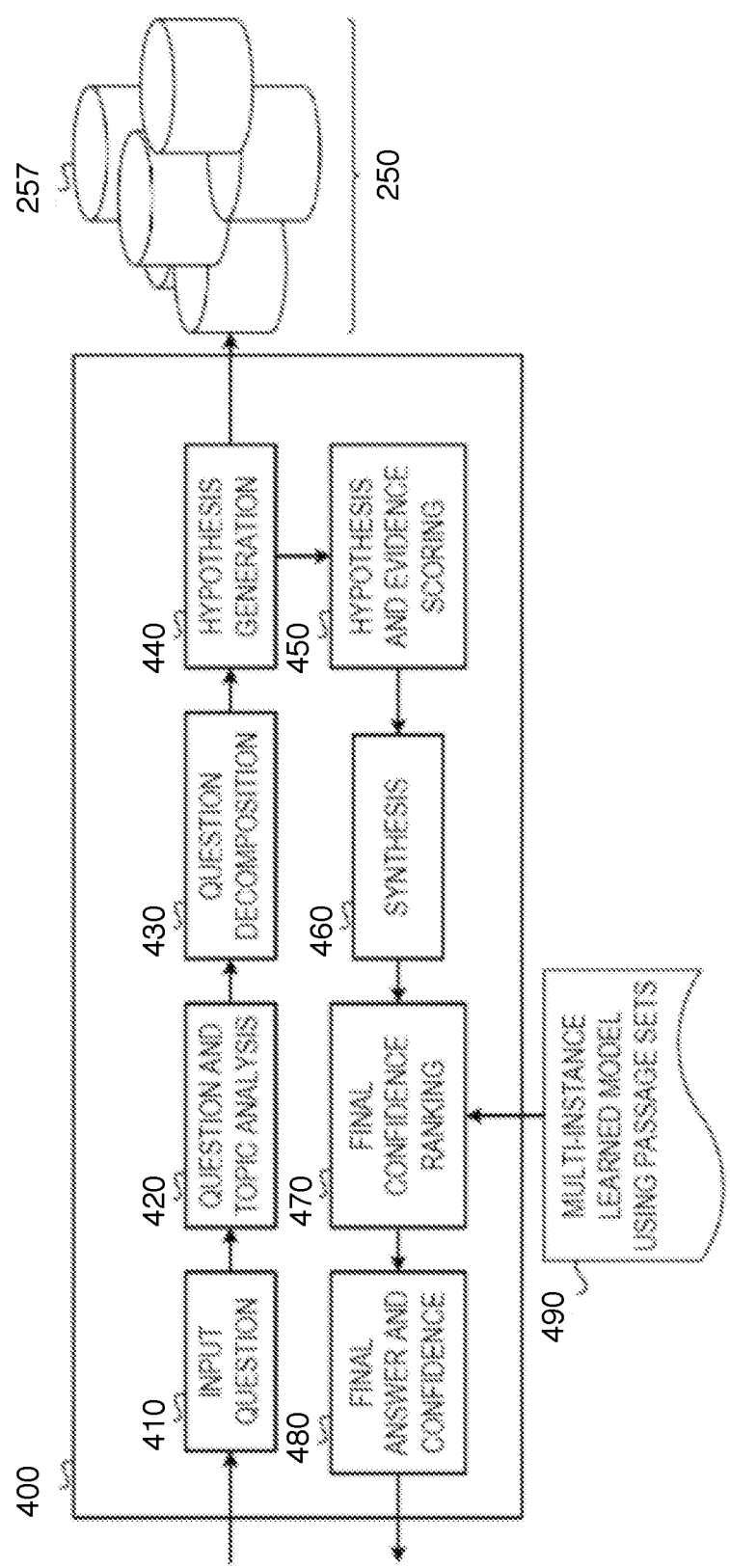
FIG. 4 is a block diagram of additional illustrative graphical user interface (GUI) components of the word processing program of FIG. 2, according to an embodiment of the invention.

FIG. 4 is a functional block diagram of a question-answering (QA) system 240 for answering a natural language question, according to an embodiment of the invention. QA system 240 may also be referred to as a processing pipeline, since it can have multiple processing stages as described in connection with FIG. 4. QA system 240 processes an input question in accordance with one illustrative embodiment. It should be appreciated that the stages of QA system 240 shown in FIG. 4 are implemented as one or more software engines, components, or the like, which are configured with logic for implementing the functionality attributed to the particular stage. Each stage is implemented using one or more of such software engines, components or the like. The software engines, components, etc., are executed on one or more processors of one or more data processing systems or devices and utilize or operate on data stored in one or more data storage devices, memories, or the like, on one or more of the data processing systems (such as computing device 200 in FIG. 2). QA system 240 of FIG. 4 may be augmented, for example, in one or more of the stages to implement the improved mechanism of the illustrative embodiments described hereafter. Additional stages may be provided to implement the improved mechanism, or separate logic from QA system 240 may be provided for interfacing with QA system 240 and implementing the improved functionality and operations of the illustrative embodiments. Significantly, although processing stages 410-480 are illustrated in sequential form, they need not interact in the particular sequence shown, unless specifically specified. Furthermore, as QA system 240 is deployable in several instances and threads, and is deployable on multiple computing nodes, many of the processing stages 410-480 may operate simultaneously or in parallel.

As shown in FIG. 4, QA system 240 includes a set of stages 410-480 through which QA system 240 operates to analyze an input question and generate a final response. In a question input stage 410, QA system 240 receives an input question that is presented in a natural language format. For example, a user inputs, via a user interface, an input question for which the user wishes to obtain an answer, e.g., "Who are Washington's closest advisors?" In response to receiving the input question, the next stage of QA system 240, i.e. the question and topic analysis stage 420, parses the input question using natural language processing (NLP) techniques to extract major features from the input question, and classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

In addition, the extracted major features include key words and phrases classified into question characteristics, such as the focus of the question, the lexical answer type (LAT) of the question, and the like. As referred to herein, a lexical answer type (LAT) is a word in, or a word inferred from, the input question that indicates the type of the answer, independent of assigning semantics to that word. For example, in the question "What maneuver was invented in the 1100s to speed up the game and involves two pieces of the same color?", the LAT is the string "maneuver." The focus of a question is the part of the question that, if replaced by the answer, makes the question a standalone statement. For example, in the question "What drug has been shown to relieve the symptoms of ADD with relatively few side effects?", the focus is "drug" since if this word were replaced with the answer, e.g., the answer "Adderall" can be used to replace the term "drug" to generate the sentence "Adderall has been shown to relieve the symptoms of ADD with relatively few side effects." The focus often, but not always, contains the LAT.

With continued reference to FIG. 4, the identified major features are then used during the question decomposition stage 430 to decompose the question into one or more queries that are applied to the corpora of data/information 250 in order to generate one or more hypotheses. The queries are generated in any known or later developed query language, such as the Structure Query Language (SQL), or the like. The queries are applied to one or more databases storing information about the electronic texts, documents, articles, websites, and the like, that make up the corpora of data/information 250. That is, these various sources themselves, different collections of sources, and the like, represent a different corpus 257 within the corpora 250. There may be different corpora 257 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Any collection of content having some similar attribute may be considered to be a corpus 257 within the corpora 250.

The queries are applied to one or more databases storing information about the electronic texts, documents, articles, websites, and the like, that make up the corpus of data/information. The queries are applied to the corpus of data/information at the hypothesis generation stage 440 to generate results identifying potential hypotheses for answering the input question, which can then be evaluated. That is, the application of the queries results in the extraction of portions of the corpus of data/information matching the criteria of the particular query. These portions of the corpus are then analyzed and used, during the hypothesis generation stage 440, to generate hypotheses for answering the input question. These hypotheses are also referred to herein as "candidate answers" for the input question. For any input question, at this stage 440, there may be hundreds of hypotheses or candidate answers generated that may need to be evaluated.

QA system 240, in stage 450, performs a deep analysis and comparison of the language of the input question and the language of each hypothesis or "candidate answer," and performs evidence scoring to evaluate the likelihood that the particular hypothesis is a correct answer for the input question. This involves using a plurality of reasoning algorithms, each performing a separate type of analysis of the language of the input question and/or content of the corpus that provides evidence in support of, or not in support of, the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis. There are various ways of generating such scores depending upon the particular analysis being performed. In general, however, these algorithms look for particular terms, phrases, or patterns of text that are indicative of terms, phrases, or patterns of interest and determine a degree of matching with higher degrees of matching being given relatively higher scores than lower degrees of matching.

Thus, for example, an algorithm may be configured to look for the exact term from an input question or synonyms to that term in the input question, e.g., the exact term or synonyms for the term "movie," and generate a score based on a frequency of use of these exact terms or synonyms. In such a case, exact matches will be given the highest scores, while synonyms may be given lower scores based on a relative ranking of the synonyms as may be specified by a subject matter expert (person with knowledge of the particular domain and terminology used) or automatically determined from frequency of use of the synonym in the corpus corresponding to the domain. Thus, for example, an exact match of the term "movie" in content of the corpus (also referred to as evidence, or evidence passages) is given a highest score. A synonym of movie, such as "motion picture" may be given a lower score but still higher than a synonym of the type "film" or "moving picture show." Instances of the exact matches and synonyms for each evidence passage may be compiled and used in a quantitative function to generate a score for the degree of matching of the evidence passage to the input question.

Thus, for example, a hypothesis or candidate answer to the input question of "What was the first movie?" is "The Horse in Motion." If the evidence passage contains the statements "The first motion picture ever made was 'The Horse in Motion' in 1878 by Eadweard Muybridge. It was a movie of a horse running," and the algorithm is looking for exact matches or synonyms to the focus of the input question, i.e. "movie," then an exact match of "movie" is found in the second sentence of the evidence passage and a highly scored synonym to "movie," i.e. "motion picture," is found in the first sentence of the evidence passage. This may be combined with further analysis of the evidence passage to identify that the text of the candidate answer is present in the evidence passage as well, i.e. "The Horse in Motion." These factors may be combined to give this evidence passage a relatively high score as supporting evidence for the candidate answer "The Horse in Motion" being a correct answer.

It should be appreciated that this is just one simple example of how scoring can be performed. Many other algorithms of various complexities may be used to generate scores for candidate answers and evidence without departing from the spirit and scope of the present invention.

In the synthesis stage 460, the large number of scores generated by the various reasoning algorithms are synthesized into confidence scores or confidence measures for the various hypotheses. This process involves applying weights to the various scores, where the weights have been determined through training of the statistical model employed by the QA system and/or dynamically updated. For example, the weights for scores generated by algorithms that identify exactly matching terms and synonym may be set relatively higher than other algorithms that are evaluating publication dates for evidence passages. The weights themselves may be specified by subject matter experts or learned through machine learning processes that evaluate the significance of characteristics evidence passages and their relative importance to overall candidate answer generation.

The weighted scores are processed in accordance with a statistical model generated through training of the QA system that identifies a manner by which these scores may be combined to generate a confidence score or measure for the individual hypotheses or candidate answers. This confidence score or measure summarizes the level of confidence that the QA system has about the evidence that the candidate answer is inferred by the input question, i.e. that the candidate answer is the correct answer for the input question.

The resulting confidence scores or measures are processed by a final confidence ranking stage 470, which compares the confidence scores and measures to each other, compares them against predetermined thresholds, or performs any other analysis on the confidence scores to determine which hypotheses/candidate answers are the most likely to be the correct answer to the input question. The hypotheses/candidate answers are ranked according to these comparisons to generate a ranked listing of hypotheses/candidate answers. From the ranked listing of candidate answers, at stage 480, a final answer and confidence score, or final set of candidate answers and confidence scores, are generated and output to the submitter of the original input question via a graphical user interface or other mechanism for outputting information.

Reference will now be made to FIGS. 1-5 to describe functions of method 500 and related methods in connection with components of the various computing environments and devices already introduced in connection with FIGS. 1-4, according to an embodiment of the invention. Method 500 and related methods can be executed via processor 204 using programming instructions of word processing program 208. In the following discussion, after discussing each step of method 500, an example natural language statement S will be referenced, to illustrate exemplary operations of the method. The natural language statement S may be, for example, "the world is flat".

Referring now to FIGS. 1-4 and FIG. 5, a word processing program receives an input text stream from a user via an input source. The input text stream includes a first natural language statement. For example, word processing program 208 receives (step 504) from user 230, via GUI 220, natural language (NL) statements NL statement 1-n. Word processing program 208 stores the received natural language statements in memory, and displays them to user 230 via GUI 220 provided on an electronic display device. According to an embodiment of the invention, the receiving (step 504) may include monitoring an input stream of the word processing program based on keyboard input from a user.

For example, user 230 types a few sentences of text into word processing program 208 via GUI 220, including the statement S: "the world is flat." Word processing program 208 receives S and displays it to the user along on in a document window displayable on a digital monitor of the device that user 230 uses.

With continued reference to FIGS. 1-4 and FIG. 5, word processing program 208 determines (step 508) that the first natural language statement includes a fact-based component expressed in natural language form. In an embodiment, determining (step 508) that the first natural language statement includes a fact-based component may include periodically engaging (see step 516) the QA system using, as input to the QA system, a portion of the input stream of the word processing program. Generally, a fact-based component of a natural language statement is a statement that can be categorized as true or false, or can be restated as a question having a yes or no answer.

For example, word processing program 208 determines that statement S includes a fact-based component. Word processing program 208 can make this determination using its own functional code or by engaging QA system 240, or another system. In any case, S may be flagged as being or having a fact-based component because the statement "the world is flat" can be characterized as true or false (functionally, there may be a third category of "unknown"). Another way that S can be determined to have a fact-based component is that it can be restated as a question having a yes or no answer: "Is the world flat"? Note that in S (whether in statement form or question form), the word "flat" is the pivot word because its flipping changes S's polarity.

With continued reference to FIGS. 1-4 and FIG. 5, word processing program 208 identifies (step 512) an initial span and an alternative span of the first natural language component, based on determining (step 508) that the first natural language statement includes a fact-based component expressed in natural language form. The fact-based component may be designated as the initial span of that natural language text. The alternate span may be a reformulation of the initial span generated by flipping the polarity of the initial span.

For example, the S's initial span $S_i$ may be "the world is flat", and its alternate span $S_a$ may be "the world is round", with "flat"/"round" being the pivot words.

With continued reference to FIGS. 1-4 and FIG. 5, word processing program 208 engages (step 516) a question-answering (QA) system by providing the initial span and the alternative span of the first natural language component to the QA system, and by receiving, in response to the providing, a set of natural language results from the QA system. For example, word processing program 208 provides the initial span and the alternative span of the first natural language component to QA system 240.

For example, word processing program 208 provides both $S_i$ and $S_a$ to QA system 240. QA system 240 processes both spans (which may optionally be reformulated in the form of a question by word processing program 208 or by QA system 240; or may be provided in statement form). QA system 240 may search corpus 250 for evidence passages related to each statement, and score them. QA system may provide to word processing program 208, for each statement, the set of evidence passages and corresponding confidence scores.

With continued reference to FIGS. 1-4 and 5, according to an embodiment of the invention, the natural language results include a passage, a keyword, or both. Each of the passage, the keyword, or both, is associated with a score reflecting how well the passage, the keyword, or both, supports an associated span of text, the associated span of text corresponding to the initial span or the alternative span of the first natural language component. The engagement (step 516) of QA system 240 may, therefore, include receiving a set of scores associated with the passages, the keyword results, or both.

With continued reference to FIGS. 1-4 and FIG. 5, word processing program 208 evaluates (step 520) the initial span and the alternative span of the first natural language component based on the received natural language results. Evaluating the two or more spans of text generally refers to checking their corresponding confidence scores as provided by QA system 240. Other evaluation functions are also contemplated. According to an embodiment, determining which of the initial span and the alternative span of the first natural language component has a higher associated score returned by the QA system.

For example, word processing program 208 may evaluate both $S_i$ and $S_a$ to determine which one has scored more highly based on the evidence passages and scores returned by QA system 240.

With continued reference to FIGS. 1-4 and FIG. 5, word processing program 208 identifies (step 524), based on the evaluating (step 520), a set of passages and keywords having associated scores corresponding to how well the set of passages and keywords support the initial span and the alternative span of the first natural language component. The associated scores may be within a specified range of scores for passages and keywords.

For example, word processing program 208 may determine that $S_a$ ("the world is round") scored more highly.

Word processing program 208 may identify the passages and keywords that contributed to the score for this statement being higher than that of $S_i$.

According to further embodiments of the invention, word processing program 208 may output, to a user 230, results of the evaluating (step 520) via an input/output (I/O) device of a computing device. According to an embodiment, outputting results of the identifying via an input/output (I/O) device of the computing device may include highlighting, on a display of the computing device, the initial span of the first natural language component, and indicating that at least one alternative text span of the first natural language component is associated with a set of passages, keywords, or both, having corresponding scores higher than scores for the initial span of the first natural language component.

For example, word processing program 208 may display to user 230 that $S_a$ scored more highly than $S_i$ and that highly ranked electronic scholarly articles supported that statement, whereas $S_i$ is supported by texts that are centuries old.

The above processes are examples of how user 230 can dramatically benefit from dynamic analysis of statements that user 230 enters into word processing application 208. The benefits are not merely automation of fact checking, but an improvement of a computer-specific practice. Some alternatives to this process may be, for example, for user 230 to copy and paste each statement into a search engine (perhaps manually adjusting the wording to adapt the statement to the specific search engine's known or perceived algorithms); click on millions of results (or as many users do, ignore valuable results simply because they do not appear on the first page!); read the content; make a subjective judgment as to whether a specific result supports or refutes the statement; and reformulate the statement and repeat all the steps for the reformulation; and repeat the process over and over again. Or, more likely, user 230 can simply forgo evaluating most of her statements.

Using embodiments of the invention, on the other hand, user 230 can see with one glance at her screen which statements have alternative spans having higher confidence scores as determined by a question-answering system (or generally, a natural language processing system). User 230 can therefore focus her time and effort on making subjective judgments and improving only those statements for which her computer has some information to offer, rather than wasting time on searches for which the computer cannot provide much help.

Reference will now be made to the Figures generally and to certain embodiments of the invention, before discussing FIGS. 6 and 7. According to an embodiment of the invention, word processing program detects when a paragraph or portion of text (e.g., a bulleted section of a presentation document) is completed. The detection may be automatic (e.g., detecting that a new paragraph is being drafted may indicate that the previous paragraph is complete), or based on user input (the user can highlight a paragraph and select a GUI option, e.g., by clicking a button). In an embodiment, anaphora resolution may be performed on the input text before substantive semantic processing.

According to an embodiment, where the word processing program is an application for creating presentation documents (e.g., slides) and where the input text includes bullet points, the word processing application may combine elements of the input text prior to substantive semantic processing. This may be achieved, for example, by combining, in a bulleted list, section titles and the items appearing within them. For example, in a bulleted list having the header "dogs" followed by a bulleted list including "chase cats", "carnivorous", "four legs", and "mammals", the word processing application may generate statements that combine the title or header with each of the items in the bulleted list: "dogs chase cats" (via a concatenation operation), "dogs are carnivorous" (via a copula insertion), "dogs have four legs" (via attribute-have insertion), and "dogs are mammals" (via a copula insertion). The word processing application can, using these generated statements, perform the various functions described above in connection with FIGS. 1-5 (for example, it can fact-check each statement).

According to a further embodiment of the invention, the word processing application may provide conflict detection information to the user. For example, if the user states "dogs are the most popular household pets in the United States" in one portion of text, and thereafter states "there are more pet cats than pet dogs in this country", the word processing program can evaluate both statements by engaging a question-answering system, and present the results to the user to make the user aware of the contradiction and to offer evidence-based information as to which one is more likely to be correct. This function of the word processing program allows the user to more quickly verify contradicting statements and to apply her subjective judgment in choosing one of the statements.

Some embodiments of the invention will now be described in the context of a cloud computing environment, with reference to FIGS. 6-7.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows.

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows.

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
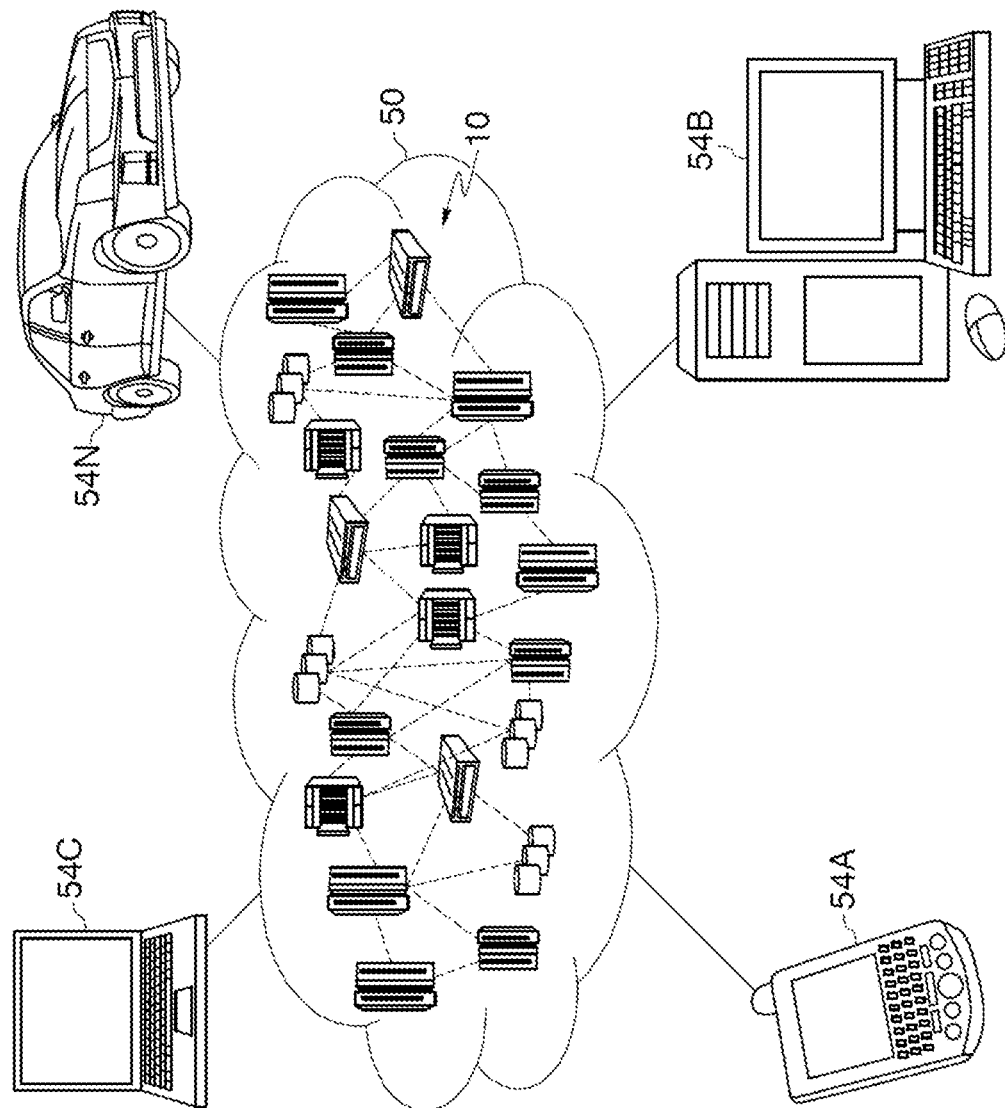
FIG. 6 is a diagram of an illustrative cloud computing environment, according to an embodiment of the invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
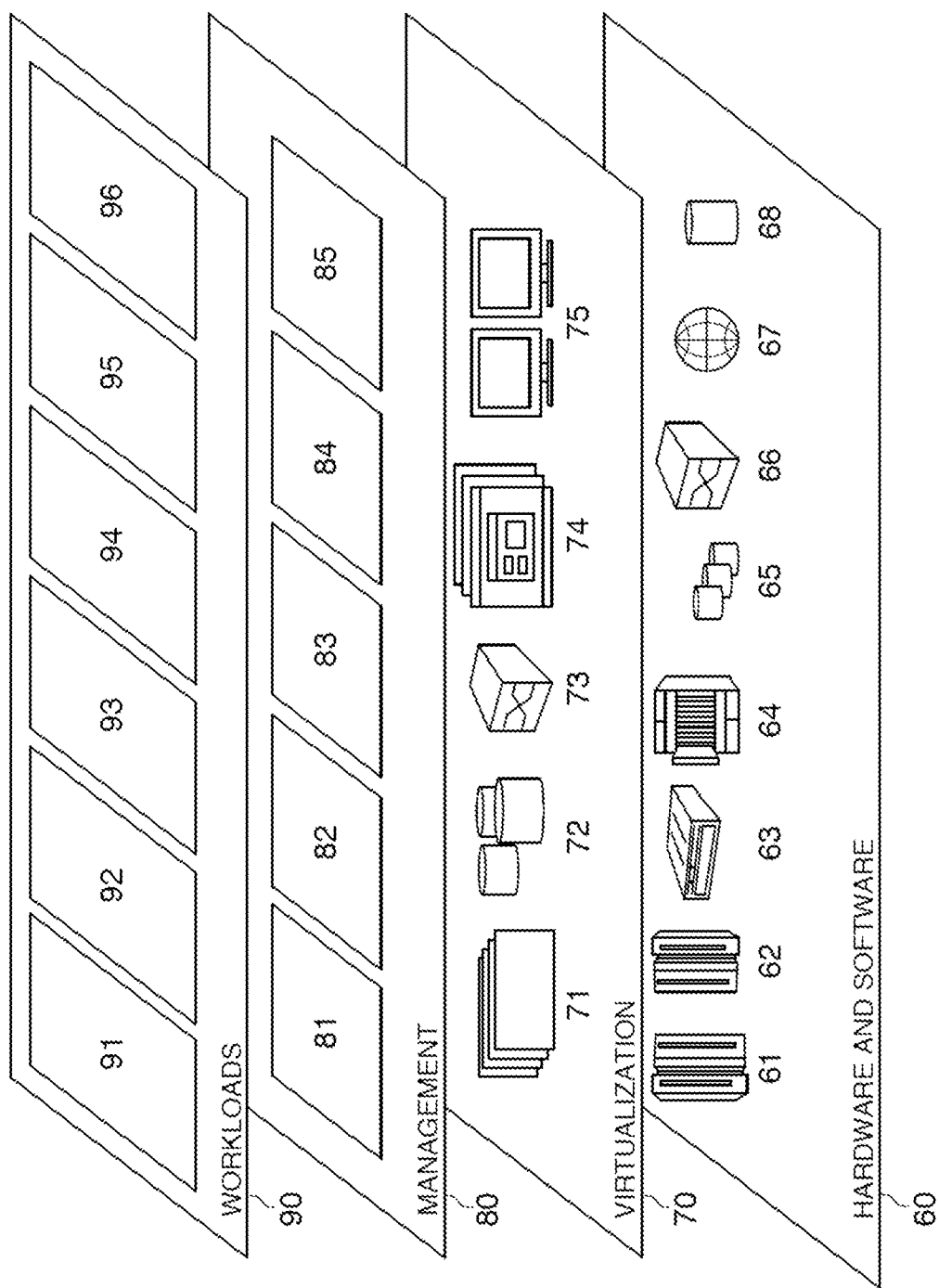
FIG. 7 is a diagram of functional layers of the cloud computing environment of FIG. 6, according to an embodiment of the invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and natural language processing 96.

Natural language processing 96 workload layer may provide one or more of the functions described in connection with FIGS. 1-5. In an embodiment of the invention, natural language processing 96 workload layer may be a functional component of QA system 240 (FIG. 2). Word processing program 208 may use a cloud application programming interface (API) call to QA system 240 via natural language processing 96 to perform one or more functions of method 500, such as engaging function (step 516, FIG. 5). In other embodiments of the invention, access and interaction with natural language processing 96 workload layer may be built into any application providing functionality related to text, to provide textual analysis. Examples include instant messaging applications (e.g., on desktop and mobile devices) and presentation preparation software.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
identifying an initial span and an alternative span of a first natural language statement comprising a fact-based true or false natural language component;
receiving a set of natural language results from a question-answering (QA) system in response to providing the initial span and the alternative span to the QA system;
wherein the initial span refers to an original formulation of the first natural language statement, or a modified form thereof that maintains a polarity of the first natural language statement, and wherein the alternative span changes the polarity of the first natural language statement;
evaluating the initial span and the alternative span of the first natural language statement based on the received natural language results; and
identifying, based on the evaluating, a set of passages and keywords having associated scores corresponding to how well the set of passages and keywords support the initial span and the alternative span of the first natural language statement, wherein the associated scores are within a specified range of scores for passages and keywords.

2. The method of claim 1, wherein the natural language results comprise a passage, a keyword, or both.

3. The method of claim 2, wherein each of the passage, the keyword, or both, is associated with a score reflecting how well the passage, the keyword, or both, supports an associated span of text, the associated span of text corresponding to the initial span or the alternative span of the first natural language statement.

4. The method of claim 2, further comprising engaging the QA system by providing the initial span and the alternative span of the first natural language statement to the QA system, wherein receiving the set of natural language results is in response to the engaging.

5. The method of claim 1, further comprising:
outputting, to a user, results of the evaluating via an input/output (I/O) device of a computing device.

6. The method of claim 5, wherein outputting results of the evaluating via an input/output (I/O) device of the computing device comprises:
highlighting, on a display of the computing device, the initial span of the first natural language statement; and
indicating that at least one alternative text span of the first natural language statement is associated with a set of passages, keywords, or both, having corresponding scores higher than scores for the initial span of the first natural language statement.

7. The method of claim 1, further comprising receiving an input text stream via an input source, the receiving of the input text stream comprising:
monitoring an input stream of a word processing program based on keyboard input from a user; and
determining that a first natural language statement comprises a fact-based component by periodically engaging the QA system using, as input to the QA system, a portion of the input stream of the word processing program.

8. The method of claim 1, wherein evaluating the initial span and the alternative span of the first natural language statement based on the received natural language results comprises:
determining which of the initial span and the alternative span of the first natural language statement has a higher associated score returned by the QA system.

9. A computer program product for processing user input in a word processing program, the computer program product comprising a non-transitory tangible storage device having program code embodied therewith, the program code executable by a processor of a computer to perform a method, the method comprising:
identifying, by the processor, an initial span and an alternative span of a first natural language statement comprising a fact-based true or false natural language component;
receiving, by the processor, a set of natural language results from a question-answering (QA) system in response to providing the initial span and the alternative span to the QA system;
wherein the initial span refers to an original formulation of the first natural language statement, or a modified form thereof that maintains a polarity of the first natural language statement, and wherein the alternative span changes the polarity of the first natural language statement;
evaluating, by the processor, the initial span and the alternative span of the first natural language statement based on the received natural language results; and
identifying, by the processor, based on the evaluating, a set of passages and keywords having associated scores corresponding to how well the set of passages and keywords support the initial span and the alternative span of the first natural language statement, wherein the associated scores are within a specified range of scores for passages and keywords.

10. The computer program product of claim 9, wherein the natural language results comprise a passage, a keyword, or both.

11. The computer program product of claim 10, wherein each of the passage, the keyword, or both, is associated with a score reflecting how well the passage, the keyword, or both, supports an associated span of text, the associated span of text corresponding to the initial span or the alternative span of the first natural language statement.

12. The computer program product of claim 10, wherein the method further comprises engaging the QA system by providing, by the processor, the initial span and the alternative span of the first natural language statement to the QA system, wherein receiving the set of natural language results is in response to the engaging.

13. The computer program product of claim 9, wherein the method further comprises:
outputting, by the processor, to a user, results of the evaluating via an input/output (I/O) device of a computing device.

14. The computer program product of claim 13, wherein outputting results of the evaluating via an input/output (I/O) device of the computing device comprises:
highlighting, by the processor, on a display of the computing device, the initial span of the first natural language statement; and
indicating, by the processor, that at least one alternative text span of the first natural language statement is associated with a set of passages, keywords, or both, having corresponding scores higher than scores for the initial span of the first natural language statement.

15. The computer program product of claim 9, wherein the method further comprises receiving an input text stream via an input source, the receiving of the input text stream comprising:

monitoring, by the processor, an input stream of the word processing program based on keyboard input from a user; and determining, by the processor, that a first natural language statement comprises a fact-based component by periodically engaging the QA system using, as input to the QA system, a portion of the input stream of the word processing program.

16. A computer system for processing user input in a word processing program, comprising:

one or more computer devices each having one or more processors and one or more tangible storage devices; and a program embodied on at least one of the one or more storage devices, the program having a plurality of program instructions for execution by the one or more processors, the program instructions comprising instructions for:

identifying an initial span and an alternative span of a first natural language statement comprising a fact-based true or false natural language component;

receiving a set of natural language results from a question-answering (QA) system in response to providing the initial span and the alternative span to the QA system;

wherein the initial span refers to an original formulation of the first natural language statement, or a modified form thereof that maintains a polarity of the first natural language statement, and wherein the alternative span changes the polarity of the first natural language statement;

evaluating the initial span and the alternative span of the first natural language statement based on the received natural language results; and identifying, based on the evaluating, a set of passages and keywords having associated scores corresponding to how well the set of passages and keywords support the initial span and the alternative span of the first natural language statement, wherein the associated scores are within a specified range of scores for passages and keywords.

17. The system of claim 16, wherein the natural language results comprise a passage, a keyword, or both.

18. The system of claim 17, wherein each of the passage, the keyword, or both, is associated with a score reflecting how well the passage, the keyword, or both, supports an associated span of text, the associated span of text corresponding to the initial span or the alternative span of the first natural language statement.

* * * * *